Oct. 21, 1952  J. W. SMITH  2,614,683
TRANSFER CONVEYER SYSTEM FOR ARTICLE WRAPPING MACHINES
Filed July 26, 1950  4 Sheets-Sheet 1

INVENTOR.
John W. Smith
BY
ATTORNEY

Oct. 21, 1952  J. W. SMITH  2,614,683
TRANSFER CONVEYER SYSTEM FOR ARTICLE WRAPPING MACHINES
Filed July 26, 1950  4 Sheets-Sheet 2

INVENTOR.
John W. Smith
BY Otis A. Earl
ATTORNEY.

INVENTOR.
John W. Smith

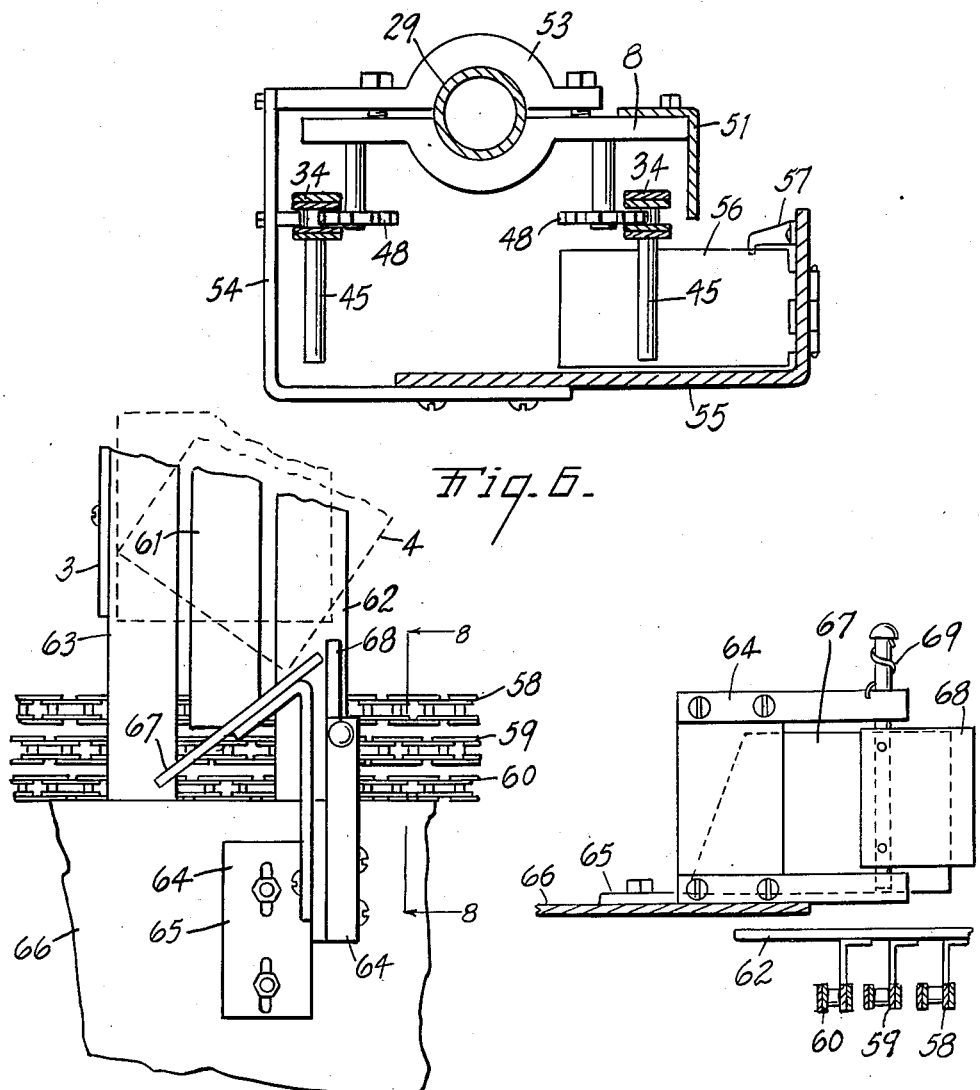

Patented Oct. 21, 1952

2,614,683

UNITED STATES PATENT OFFICE 2,614,683

TRANSFER CONVEYER SYSTEM FOR ARTICLE WRAPPING MACHINES

John W. Smith, Battle Creek, Mich., assignor to Battle Creek Bread Wrapping Machine Company, Battle Creek, Mich.

Application July 26, 1950, Serial No. 176,031

15 Claims. (Cl. 198—75)

This invention relates to improvements in transfer conveyor system for article wrapping machines.

The principal objects of this invention are:

First, to provide a synchronized conveyor system cooperative with the infeed conveyor of a wrapping machine for successively transferring articles or stacks of articles from a remote source to the infeed conveyor.

Second, to provide a transfer conveyor having an elongated loading section which provides working space for a number of operators, the conveyor being synchronized with the infeed conveyor of a wrapping machine.

Third, to provide a transfer conveyor operatively associated and synchronized with the infeed conveyor of a wrapping machine and delivering to the infeed conveyor at 90° with respect to the line of travel of the infeed conveyor.

Fourth, to provide a transfer conveyor system by means of which stacks of small objects such as crackers may be conveyed from a source of supply such as a belt from the bake ovens to the infeed conveyor of one or more wrapping machines in preselected quantities.

Fifth, to provide a transfer conveyor system which is readily adaptable and extensible to various arrangements of a supply belt and wrapping machines.

Sixth, to provide a transfer conveyor which is easily installed and swingable out of operating position when it is not in use.

Other objects and advantages of my invention will be apparent from a consideration of the following description and claims. The drawings, of which there are four sheets, illustrate my transfer conveyor in two of several possible relationships with respect to article wrapping machines.

Fig. 6 is a transverse cross sectional view through the lateral reach of the transfer conveyor taken along the plane of the line 6—6 in Figs. 1 and 5.

Fig. 7 is an enlarged fragmentary plan view of article straightening mechanism mounted adjacent to the infeed conveyor of the wrapping machine to straighten articles deposited on the infeed conveyor by the transfer conveyor.

Fig. 8 is a fragmentary transverse vertical cross sectional view through the infeed conveyor taken along the plane of the line 8—8 in Fig. 7 and illustrating the article straightening mechanism in rear elevation.

My machine is primarily adapted and designed for the handling of soda crackers which are commonly baked in the familiar square subdivided into four individual crackers. However, the machine is equally effective in the handling and packaging of cookies and other articles in any preselected multiple or combination of articles. The description of the machine and its operation in connection with soda crackers should therefore not be taken as limiting the scope of my invention. It has recently been proposed to break up a one pound carton of soda crackers into several individually wrapped packages containing a fraction of a pound each. In this manner, the purchaser of a one pound carton can remove and open part of the contents of the carton while the remainder of the contents remain sealed to protect their freshness for later use. Wrapping machines for wrapping small stacks of crackers or other articles have been developed and are arranged to be supplied with stacks of crackers or articles of the desired size by an infeed conveyor having a series of successively advanced flights or pockets thereon.

Inasmuch as the wrapping machines referred to above are relatively heavy and complicated, bakeries have experienced difficulty in positioning the machines so that the freshly baked crackers can conveniently and inexpensively be supplied to the infeed conveyors in the correct amounts and with sufficient speed to utilize the full capacity of the wrapping machine. My transfer conveyor system now to be described permits a more free selection of the location of the wrapping machine and provides adequate space for operators to make up and load the stacks of crackers or articles.

Figure 1:
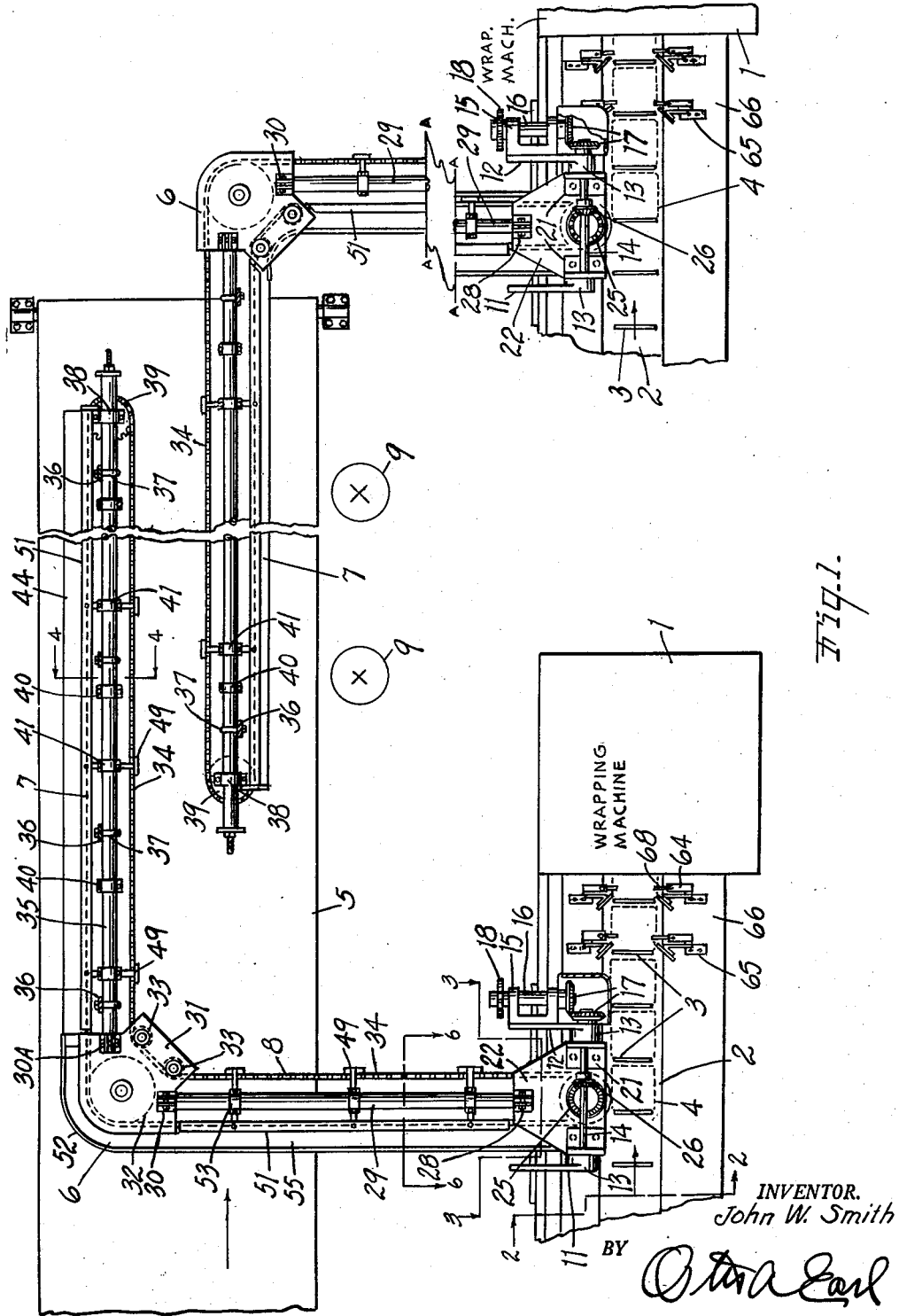
Fig. 1 is a plan view partially broken away of two of my transfer conveyors operatively associated with two wrapping machines and a supply belt.

In Fig. 1 I have generally indicated two wrapping machines 1, the details of which are unimportant to the present invention. Each wrapping machine is supplied with stacks of crackers to be wrapped by an infeed conveyor 2 having series of cross plates 3 thereon which form successive flights or pockets for advancing the articles, as indicated at 4, to the wrapping machine. A supply belt for conveying the freshly baked crackers from the bake ovens is indicated at 5. The crackers may be supplied on this belt either in pans or directly on the belt in large stacks as they come from the bake ovens.

Two transfer conveyors indicated generally at 6 are associated with the loading belt to feed to each of the infeed conveyors 2. The transfer conveyors include a loading reach 7 disposed over the supply belt 5 and a laterally extending reach 8 which is connected to one of the infeed conveyors. It will be noted that the upper loading reach shown in Fig. 1 is associated with the left wrapping machine and is designed to be loaded from the upper or far side of the supply belt 5 with respect to the wrapping machines. The lower loading reach 7 is arranged to be loaded by operators standing on the near side of the supply belt as indicated by the loading operators' stations 9.

Figures 2, 3:
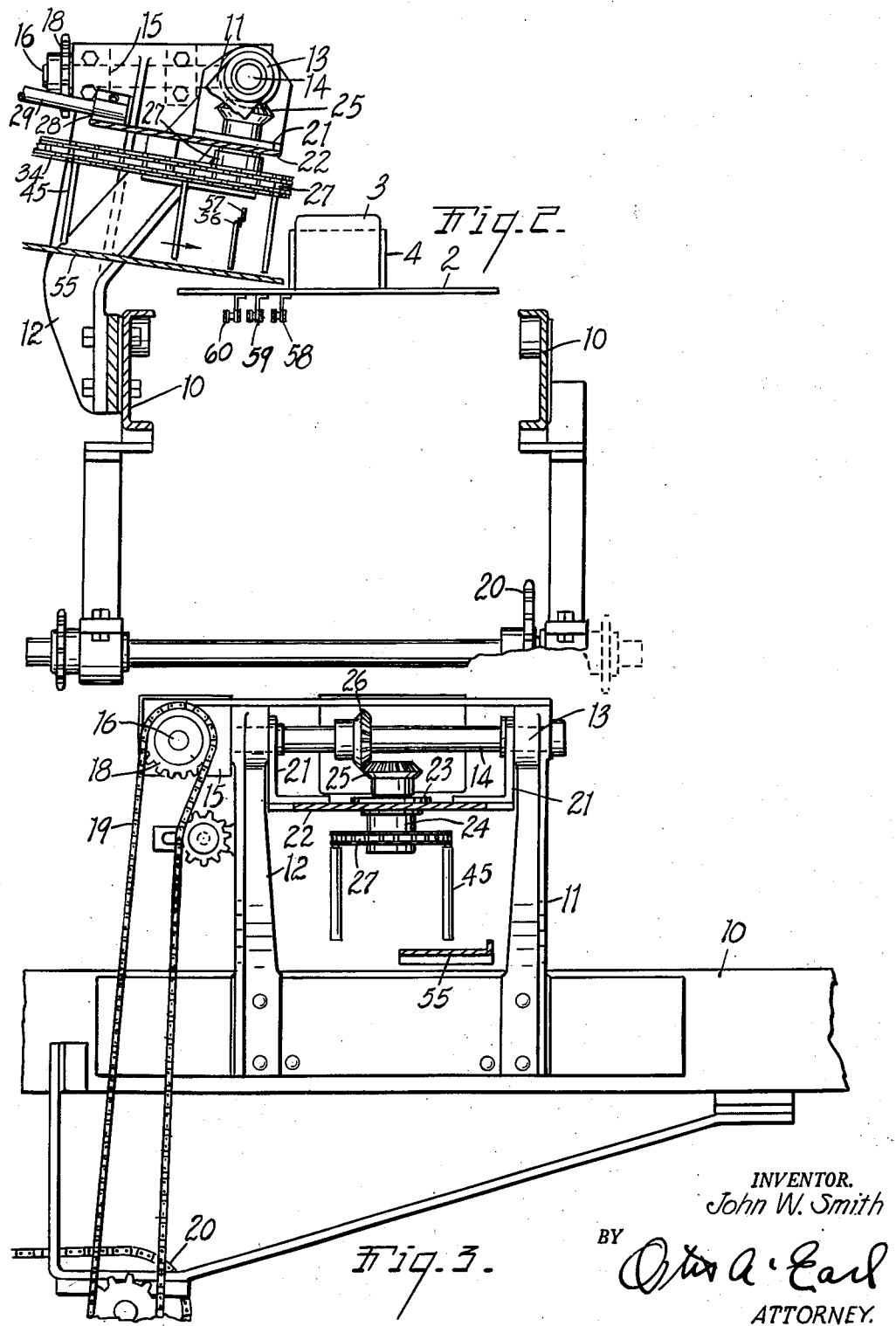
Fig. 2 is a vertical cross sectional view illustrating the junction of the transfer conveyor with the infeed conveyor of a wrapping machine and taken generally along the plane of the line 2—2 in Fig. 1.
Fig. 3 is a rear elevational view of the connection between the transfer conveyor and the infeed conveyor taken generally along the plane of the line 3—3 in Fig. 1.

The transfer conveyors are connected to and driven from their respective wrapping machines, and since the driving connections are similar, only one will be described. As is most clearly illustrated in Figs. 1, 2 and 3, the side frame 10 of the infeed conveyor serves as a support for a first bracket arm 11 and a second bracket arm 12. The upper ends of the bracket arms are bent over the top of the infeed conveyor and have journals 13 formed therein for rotatably supporting the cross shaft 14. A horizontal U-shaped bracket 15 secured to the second upright bracket 12 carries a short shaft 16 at right angles to the shaft 14, and the shafts 14 and 16 are drivingly inter-connected by the beveled gears 17. The rear end of the shaft 16 carries a sprocket 18 which is driven in timed relationship with the drive of the infeed conveyor and wrapping machine by the chain 19. A portion of the driving mechanism of the infeed conveyor is indicated at 20.

Mounted interiorly of the upright brackets 11 and 12 and swingably supported on the shaft 14 are a pair of angle brackets 21 which serve to support the head plate 22 therebetween. The head plate 22 carries a bearing 23 for the generally vertically extending shaft 24. The upper end of the shaft 24 above the head plate 22 carries a beveled gear 25 engaged with the beveled gear 26 on the shaft 14, and the lower end of the shaft 24 carries a driving sprocket 27 for the transfer conveyor. It will be noted particularly from Fig. 2 that the driving sprocket 27 projects slightly over the infeed conveyor 2 but clears the vertical projection of the cross plates 3 of the infeed conveyor.

The upper or far side of the head plate 22 has a socket 28 mounted thereon and adapted to clampingly receive and support the front end of a pipe-like beam 29 which forms the main structural support for the lateral reach 8 of the transfer conveyor. The rear end of the beam 29 is clampingly received in a socket 30 carried on a corner plate or casting 31. The corner plate rotatably carries a corner sprocket 32 and a pair of interior idler sprockets 33. The conveyor chain 34 of the transfer conveyor is trained around the sprockets 27, 32 and 33.

Extending longitudinally from the corner plate 31 and generally parallel to the infeed conveyor 2 is a pipe-like beam 35 which supports the longitudinal reach 7 of the transfer conveyor. The beam 35 is secured to the corner plate by a socket 30A similar to the socket 30. The beam 35 can be sectional and as long as is desired and is supported from the ceiling of the building by suspension rods 36 and U bolt clamps 37, as is most clearly illustrated in Figs. 1 and 5. The free end of the longitudinal beam 35 carries a mounting bracket 38 for an end sprocket 39, which completes the circuit for the chain 34.

Figure 4:
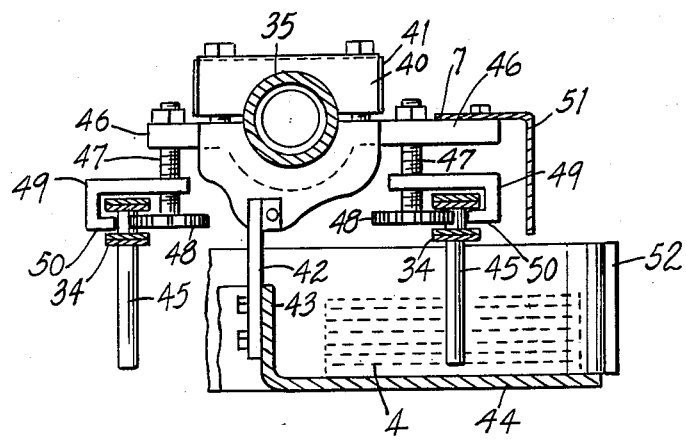
Fig. 4 is a vertical cross sectional view through the loading portion of the transfer conveyor and taken along the plane of the line 4—4 in Fig. 1.

The construction of the loading reach 7 of the transfer conveyor is most clearly illustrated in Figs. 1 and 4. The beam 35 has a plurality of clamp brackets 40 and 41 secured at intervals therealong. The brackets 40, one of which is shown in elevation in Fig. 4, carry depending struts 42 to which is secured the up-turned flange 43 of a loading shelf 44. The shelf 44 projects to the rear side of the supply belt 5 in spaced relationship underneath the feeding reach of the chain 34. At spaced intervals along its length, the chain 34 is provided with depending pins 45 which serve to advance stacks of crackers along the loading tray 44 as the stacks are placed on the tray by operators.

Brackets 41 on the beam 35 have projecting arms 46 which serve to support the adjustable screws 47 on the lower ends of which idler sprockets 48 are rotatably mounted. The screws 47 also support guide arms 49 having guide shoes 50 which engage the opposite sides of the chain 34 from the sprockets 48 and thus vertically support the conveyor chain. A guard plate 51 is carried by the brackets 46 over the chain where it traverses the loading tray 44.

Where the loading tray 44 approaches the corner plate 31, there is provided a corner wall and tray 52 which receives the stacks of crackers ahead of each pin 45 and turns the stack 90° into the lateral or transverse reach 8 of the conveyor. The construction of the lateral reach of the conveyor is most clearly illustrated in Figs. 5 and 6. Brackets 53 secured to the beam 29 serve to support arms 54 which in turn support the feed chute 55 delivering from the corner tray 52. Idler sprockets 48 and a guard plate 51 are also supported from the brackets 53 as on the loading reach of the conveyor.

Figure 5:
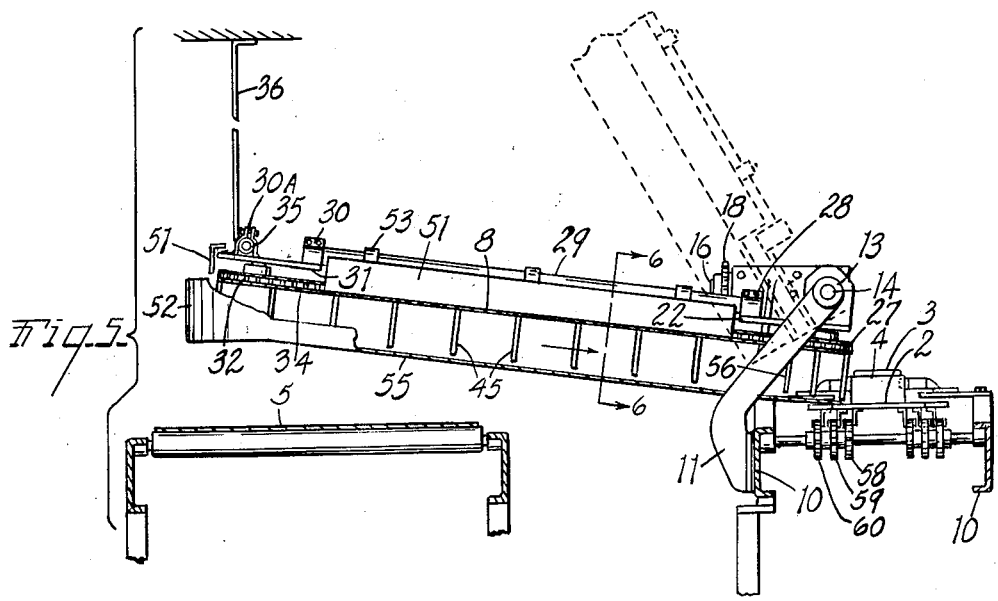
Fig. 5 is an end elevational view partially broken away in vertical cross section of the laterally extending reach of the transfer conveyor operatively associated with the infeed conveyor of a wrapping machine and the supply belt from a source of supply such as bake ovens (not illustrated).

With particular attention to Figs. 5 and 6, it will be noted that the lower end of the transfer chute 55 is provided with a gate 56 biased to closed position by the spring arm 57. The gate 56 assures that each stack of crackers descending the transverse chute will not enter onto the infeed conveyor until positively pushed through the gate 56 by one of the pins 45 in timed relationship with the advancing plates 3 of the infeed conveyor. It will be appreciated that one pin 45 and stack of crackers will be fed onto the infeed conveyor in front of each back plate 3. While I prefer to feed the stacks of crackers from the incoming side of the drive sprocket 27 with respect to the path of travel of the incoming conveyor, it is possible to reverse the rotation of the drive sprocket 27 and the transfer conveyor chain so that each pin 25 moves around the drive sprocket in the opposite direction to the movement of the infeed conveyor since the pins 45 clear the back plates 3. With reverse rotation of the feed chain, the loading tray and feed chute obviously will be mounted on the other sides of the loading reach and transverse reach of the transfer conveyor. With either direction of rotation of the drive sprocket 27, the pins 45 merely advance a stack of crackers off of the transverse chute onto the infeed conveyor, where they are picked up and carried toward the wrapping machine by the back plates 3. As is shown by the dotted lines in Fig. 5, the transfer conveyor may be disconnected from the suspension rods 36 and pivoted upwardly on the shaft 14 when not in use.

The infeed conveyors of the wrapping machines are adapted for cooperation with the transfer conveyor but being provided with three sets of feed chains 58, 59 and 60. It will be understood that the sets of chains are duplicated at each side of the infeed conveyor so that the two interior chains 58 may support a series of middle cross bars 61. The intermediate set of chains 59 support lead bars 62, and the exterior set of chains 60 support the rear cross bars 63 and the back plates 3. By well-known mechanisms, the sets of chains can be moved relative to each other to vary the longitudinal width of the pockets of the infeed conveyor but are drivingly rotated at the same speed to advance each pocket uniformly. After the incoming stacks of crackers have been received and straightened on the cross bars 61, 62 and 63, the interior cross bars 61 may be caused to drop out from underneath the stack of crackers by terminating the interior chains 58 sooner than the intermediate and exterior chains 59 and 60. Thus each pocket of the infeed conveyor has an opening in the center through which portions of the wrapping machine may operate to remove the stacks of crackers from the conveyor.

Since both the infeed conveyor 2 and the transverse conveyor 6 operate continually when the mechanism is in operation, it is possible that the several crackers of a stack of crackers may become misaligned or twisted in passing from the transfer conveyor onto the infeed conveyor. I have accordingly provided straightening devices 64 mounted in pairs on each side of the infeed conveyor and between the discharge end of the transfer conveyor and the wrapping machine. As is most clearly shown in Figs. 7 and 8, these straightening mechanisms consist of brackets 65 mounted on panels 66 at the sides of the infeed conveyor. The brackets 65 support the obliquely converging guide plates 67 which project over the sides of the infeed conveyor and are adjusted laterally so as to pass the stack of crackers between the opposed oblique plates but to engage misaligned crackers of the stacks. Also mounted on the bracket 65 behind the oblique plate 67 are the vertically pivoted gates 68, which are biased to closed position transversely of the infeed conveyor by the springs 69. The inner edges of the gates 68 project inwardly beyond the inner edges of the oblique plates 67 to engage the projecting portions of misaligned crackers and yieldingly twist the misaligned crackers into alignment with the remainder of the stack. After passing between two pairs of these aligning devices, the stacks of crackers are properly aligned and centered on the infeed conveyor for reception into the wrapping machine.

I have thus described a highly practical embodiment of my transfer conveyor in combination with a supply belt and wrapping machines. Quite obviously, the conveyor system is subject to being modified in various respects to adapt it to various arrangements of feed belts and wrapping machines, and I do not limit my invention to the particular arrangements shown.

Having thus described my invention, what I claim as new and desire to secure by Letters Patent, is:

1. A transfer conveyor system in combination with a pair of wrapping machines having infeed conveyors and a supply belt disposed in parallel laterally spaced relation to the infeed conveyors comprising, a pair of uprights secured to the framework of each infeed conveyor and projecting over the tops of said infeed conveyors, shafts journaled in the upper ends of said uprights parallel to said infeed conveyors, brackets swingably mounted on said shafts, head plates supported on said brackets, generally vertical shafts journaled in said head plates and having bevelled gear connections to said first shafts, a third shaft journaled on one of the uprights on each infeed conveyor and drivingly connected to said first shaft thereon, means connecting said third shafts to said infeed conveyors to be driven in timed relationship therewith, a drive sprocket carried on each vertical shaft beneath said head plates and having one portion of its periphery overlying the side of said infeed conveyor associated therewith, a pair of L-shaped supporting structures associated one with each of said infeed conveyors and each having one transverse leg secured to the head plate of its associated conveyor, the other legs of said structures being supported in oppositely extending parallel overlapping relationship over said supply belt, idler sprockets carried on said L-shaped structures, feed chains trained around said drive sprockets and said idler sprockets in parallel feeding and returning reaches, feed pins secured at intervals to said feed chains, oppositely facing loading platforms carried by said supporting structures underneath the feeding reaches of said feed chains and over said supply belt, feed chutes extending along said first legs of said supporting structures from said loading platforms thereof to the edges of said infeed conveyors underneath said drive sprockets, and spring closed gates projecting across the lower ends of said feed chutes and swingable outwardly thereof toward said infeed conveyors, said transfer conveyors being timed to advance one of said pins to the inner side of said drive sprockets as each successive pocket of the infeed conveyors approaches said drive sprockets.

2. A transfer conveyor system in combination with a pair of wrapping machines having infeed conveyors and a supply belt disposed in parallel laterally spaced relation to the infeed conveyors comprising, a pair of uprights secured to the framework of each infeed conveyor and projecting over the tops of said infeed conveyors, shafts journaled in the upper ends of said uprights parallel to said infeed conveyors, brackets swingably mounted on said shafts, head plates supported on said brackets, generally vertical shafts journaled in said head plates and having bevelled gear connections to said first shafts, a third shaft journaled on one of the uprights on each infeed conveyor and drivingly connected to said first shaft thereon, means connecting said third shafts to said infeed conveyors to be driven in timed relationship therewith, a drive sprocket carried on each vertical shaft beneath said head plates and having one portion if its periphery overlying the side of said infeed conveyor associated therewith, a pair of L-shaped supporting structures associated one with each of said infeed conveyors and each having one transverse leg secured to the head plate of its associated conveyor, the other legs of said structures being supported in parallel relationship over said supply belt, idler sprockets carried on said L-shaped structures, feed chains trained around said drive sprockets and said idler sprockets in parallel feeding and returning reaches, feed pins secured at intervals to said feed chains, oppositely facing loading platforms carried by said supporting structures underneath the feeding reaches of said feed chains and over said supply belt, and feed chutes extending along said first legs of said supporting structures from said loading platforms thereof to the edges of said infeed conveyors underneath said drive sprockets, said transfer conveyors being timed to advance one of said pins to the inner side of said drive sprockets as each successive pocket of the infeed conveyors approaches said drive sprockets.

3. A transfer conveyor system in combination with a wrapping machine having an infeed conveyor with feed pockets and a supply belt disposed in parallel laterally spaced relation to the infeed conveyor comprising a pair of uprights secured to the framework of the infeed conveyor and projecting over the top of said infeed conveyor, a shaft journaled in the upper ends of said uprights parallel to said infeed conveyor, brackets swingably mounted on said shaft, a head plate supported on said brackets, a generally vertical shaft journaled in said head plate and having a bevelled gear connection to said first shaft, a third shaft journaled on one of said uprights and drivingly connected to said first shaft, means connecting said third shaft to said infeed conveyor to be driven in timed relationship therewith, a drive sprocket carried on said vertical shaft beneath said head plate and having one portion of its periphery overlying the side of said infeed conveyor, an L-shaped supporting structure having one leg secured to said head plate and its other leg supported over said supply belt, idler sprockets carried on said L-shaped structure, a feed chain trained around said drive sprocket and said idler sprockets in parallel feeding and returning reaches, feed pins secured at intervals to said feed chain, a loading platform carried by said supporting structure underneath the feeding reach of said feed chain and over said supply belt, a feed chute extending along the other leg of said supporting structure from said loading platform to the edge of said infeed conveyor underneath said drive sprocket, and a spring closed gate projecting across the lower end of said feed chute and swingable outwardly thereof toward said infeed conveyor, said transfer conveyor being timed to advance one of said pins to the inner side of said drive sprocket as each successive pocket of the infeed conveyor approaches said drive sprocket.

4. A transfer conveyor system in combination with a wrapping machine having an infeed conveyor with feed pockets and a supply belt disposed in parallel laterally spaced relation to the infeed conveyor comprising a pair of uprights secured to the framework of the infeed conveyor and projecting over the top of said infeed conveyor, a shaft journaled in the upper ends of said uprights parallel to said infeed conveyor, brackets swingably mounted on said shaft, a head plate supported on said brackets, a generally vertical shaft journaled in said head plate and having a bevelled gear connection to said first shaft, a third shaft journaled on one of said uprights and drivingly connected to said first shaft, means connecting said third shaft to said infeed conveyor to be driven in timed relationship therewith, a drive sprocket carried on said vertical shaft beneath said head plate and having one portion of its periphery overlying the side of said infeed conveyor, an L-shaped supporting structure having one leg secured to said head plate and its other leg supported over said supply belt, idler sprockets carried on said L-shaped structure, a feed chain trained around said drive sprocket and said idler sprockets in parallel feeding and returning reaches, feed pins secured at intervals to said feed chain, a loading platform carried by said supporting structure underneath the feeding reach of said feed chain and over said supply belt, and a feed chute extending along the other leg of said supporting structure from said loading platform to the edge of said infeed conveyor underneath said drive sprocket, said transfer conveyor being timed to advance one of said pins to the inner side of said drive sprocket as each successive pocket of the infeed conveyor approaches said drive sprocket.

5. A transfer conveyor system in combination with a wrapping machine having an infeed conveyor with feed pockets and a supply belt disposed in parallel laterally spaced relation to the infeed conveyor comprising, a pair of uprights secured to the framework of the infeed conveyor and projecting above the side of said infeed conveyor, a shaft journaled in the upper ends of said uprights parallel to said infeed conveyor, a head plate swingably mounted on said shaft, a second shaft journaled in said head plate and having a bevelled gear connection to said first shaft, a third shaft journaled on one of said uprights and drivingly connected to said first shaft, means connecting said third shaft to said infeed conveyor to be driven in timed relationship therewith, a drive sprocket carried on said second shaft beneath said head plate and having one portion of its periphery overlying the side of said infeed conveyor, an L-shaped supporting structure having one leg secured to said head plate and its other leg supported over said supply belt, idler sprockets carried on said L-shaped structure, a feed chain trained around said drive sprocket and said idler sprockets in parallel feeding and returning reaches along both branches of said structure, feed pins secured at intervals to said feed chain, a loading platform carried by said supporting structure underneath the feeding reach of said feed chain and over said supply belt, a feed chute extending along the other leg of said supporting structure from said loading platform to the edge of said infeed conveyor underneath said feed sprocket, and a spring closed gate projecting across the lower end of said feed chute and swingable outwardly thereof toward said infeed conveyor, said transfer conveyor being timed to advance one of said pins to the inner side of said drive sprocket as each successive pocket of the infeed conveyor approaches said drive sprocket.

6. A transfer conveyor system in combination with a wrapping machine having an infeed conveyor with feed pockets and a supply belt disposed in parallel laterally spaced relation to the infeed conveyor comprising, a pair of uprights secured to the framework of the infeed conveyor and projecting above the side of said infeed conveyor, a shaft journaled in the upper ends of said uprights parallel to said infeed conveyor, a head plate swingably mounted on said uprights and swingable about said shaft, a second shaft journaled in said head plate and having a bevelled gear connection to said first shaft, a third shaft journaled on one of said uprights and drivingly connected to said first shaft, means connecting said third shaft to said infeed conveyor to be driven in timed relationship therewith, a drive sprocket carried on said second shaft beneath said head plate, an L-shaped supporting structure having one leg secured to said head plate and its other leg supported over said supply belt, idler sprockets carried on said L-shaped structure, a feed chain trained around said drive sprocket and said idler sprockets in parallel feeding and returning reaches along both branches of said structure, feed pins secured at intervals to said feed chain, a loading platform carried by said supporting structure underneath the feeding reach of said feed chain and over said supply belt, and a feed chute extending along the other leg of said supporting structure from said loading platform to the edge of said infeed conveyor underneath said feed sprocket, said transfer conveyor being timed to advance one of said pins to the inner side of said drive sprocket as each successive pocket of the infeed conveyor approaches said drive sprocket.

7. A transfer conveyor attachable to a wrapping machine having an infeed conveyor mounted on a frame comprising, a support attachable to said frame alongside said infeed conveyor to project thereabove, a horizontal shaft journaled in said support near the upper end thereof, driving means carried by said support for connecting said shaft to said infeed conveyor, a generally vertical shaft tiltably carried by said support and drivingly connected to said first shaft, a drive sprocket carried by said vertical shaft and spaced above the level of said infeed conveyor, an L-shaped supporting structure having one leg tiltably secured to said support at a horizontal angle to said infeed conveyor and tiltable with said vertical shaft in a vertical plane, said L-shaped structure having its other leg adapted to be supported remotely from said infeed conveyor, idler sprockets carried along both legs of said L-shaped structure, a feed chain trained around said drive sprocket and said idler sprockets in parallel feeding and return reaches along both legs of said structure, feed pins secured at intervals to said feed chain and depending therebelow, a loading platform carried by said other leg of said supporting structure underneath a feeding reach of said feed chain, and a feed chute extending along said one leg of said supporting structure from said loading platform to the edge of said infeed conveyor, said feed chain being timed to advance one of said pins to said drive sprocket as each successive pocket of the infeed conveyor approaches said drive.

8. A transfer conveyor attachable to a wrapping machine having an infeed conveyor mounted on a frame comprising, a support attachable to said frame alongside said infeed conveyor to project thereabove, a horizontal shaft journaled in said support near the upper end thereof, driving means carried by said support for connecting said shaft to said infeed conveyor, a generally vertical shaft tiltably carried by said support and drivingly connected to said first shaft, a drive sprocket carried by said vertical shaft and spaced above the level of said infeed conveyor, an L-shaped supporting structure having one leg tiltably secured to said support at a horizontal angle to said infeed conveyor and tiltable with said vertical shaft in a vertical plane, said L-shaped structure having its other leg adapted to be supported remotely from said infeed conveyor, idler sprockets carried along both legs of said L-shaped structure, a feed chain trained around said drive sprocket and said idler sprockets in feeding and return reaches along both legs of said structure, feed pins secured at intervals to said feed chain and depending therebelow, a loading platform carried by said other leg of said supporting structure underneath a feeding reach of said feed chain, and a feed chute extending along said one leg of said supporting structure from said loading platform to the edge of said infeed conveyor, said feed chain being timed to advance one of said pins to said drive sprocket as a pocket of the infeed conveyor approaches said drive sprocket.

9. A transfer conveyor attachable to a wrapping machine having an infeed conveyor mounted on a frame comprising, a support attachable to said frame alongside said infeed conveyor to project thereabove, a shaft journaled in said support near the upper end thereof, driving means carried by said support for connecting said shaft to said infeed conveyor, a drive sprocket carried by said shaft in generally flat facing relation to said infeed conveyor and spaced above the level of said infeed conveyor, an L-shaped supporting structure having one leg secured to said support at an angle to said infeed conveyor and its other leg adapted to be supported remotely from said infeed conveyor, idler sprockets carried on both legs of said L-shaped structure, a feed chain trained around said drive sprocket and said idler sprockets in feeding and return reaches along both legs of said structure, feed pins secured at intervals to said feed chain and depending therebelow, a loading platform carried by said other leg of said supporting structure underneath a feeding reach of said feed chain, and a feed chute extending along said one leg of said supporting structure from said loading platform to the edge of said infeed conveyor, said feed chain being timed to advance one of said pins to said drive sprocket as a pocket of the infeed conveyor approaches said drive sprocket.

10. A transfer conveyor attachable to a wrapping machine having an infeed conveyor mounted on a frame comprising, a support attachable to said frame alongside said infeed conveyor to project thereabove, a shaft journaled in said support near the upper end thereof, driving means carried by said support for connecting said shaft to said infeed conveyor, a drive sprocket carried by said shaft in generally flat facing relation to said infeed conveyor and spaced above the level of said infeed conveyor, a supporting structure having one end secured to said support at an angle to said infeed conveyor and its other end adapted to be supported remotely from said infeed conveyor, idler sprockets carried on said structure, a feed chain trained around said drive sprocket and said idler sprockets in feeding and return reaches, feed pins secured at intervals to said feed chain and depending therebelow, and a loading platform carried by said supporting structure underneath a feeding reach of said chain and extending to the edge of said infeed conveyor, said feed chains being timed to advance one of said pins to said drive sprocket as a pocket of the infeed conveyor approaches said drive sprocket.

11. Cracker loading and wrapping apparatus comprising in combination a wrapping machine having an infeed conveyor with a plurality of continuously advancing pockets, an L-shaped frame having one leg pivotally supported alongside of said infeed conveyor and extending at an angle therefrom and another leg adapted to be positioned over a source of supply as a loading portion, slideways carried underneath said frame to support stacks of crackers, a closed chain loop movably trained along said frame, depending pins carried at intervals along said chain to advance said stacks of crackers on said slideways, and means drivingly connecting said infeed conveyor to said chain for driving said chain in timed relationship to said infeed conveyor to advance a stack of crackers into each pocket of said infeed conveyor.

12. Article loading and wrapping apparatus comprising in combination a wrapping machine having an infeed conveyor with a plurality of continuously advancing pockets, an L-shaped frame having one leg pivotally supported alongside of said infeed conveyor and extending at an angle therefrom and another leg adapted to be positioned over a source of supply of articles as a loading portion, slideways positioned along said frame to support stacks of articles, a closed chain loop movably trained along said frame, pins carried at intervals along said chain to advance said stacks on said slideways, and means drivingly connecting said infeed conveyor to said chain for driving said chain in timed relationship to said infeed conveyor to advance a stack of articles into each pocket of said infeed conveyor.

13. Conveyor structure for transferring articles from a source of supply to a wrapping machine conveyor comprising a longitudinal support beam of circular cross section, a transverse support beam of circular cross section extending at an angle from said wrapping machine conveyor, a corner plate having sockets thereon clampingly receiving the adjacent ends of said beams, angularly adjustable brackets secured to said beams and supporting connected platforms below and to one side of said beams, a head plate secured to the opposite end of said transverse beam from said corner plate, a drive sprocket rotatably mounted on and beneath said head plate and generally parallel thereto, a corner sprocket generally co-planar with said drive sprocket and rotatably mounted on said corner plate, an end sprocket rotatably mounted on the free end of said longitudinal beam, a chain trained around said sprockets in parallel feeding and returning reaches, pins secured to said chain and depending therefrom at intervals over said platforms to advance stacks of articles therealong, and means connected to said head plate and connectable to a driven portion of said wrapping machine conveyor for driving said drive sprocket in timed relationship to said wrapping machine conveyor.

14. Conveyor structure for transferring articles from a source of supply to a wrapping machine conveyor comprising a longitudinal support beam, a transverse support beam extending at an angle from said wrapping machine conveyor, a corner plate having sockets thereon clampingly receiving the adjacent ends of said beams, brackets secured to said beams and supporting connected platforms below and to one side of said beams, a head plate secured to the opposite end of said transverse beam from said corner plate, a drive sprocket rotatably mounted on and beneath said head plate and generally parallel thereto, a corner sprocket generally co-planar with said drive sprocket and rotatably mounted on said corner plate, an end sprocket rotatably mounted on the free end of said longitudinal beam, a chain trained around said sprockets in parallel feeding and returning reaches, pins secured to said chain and depending therefrom at intervals over said platforms to advance stacks of articles therealong, and means for driving said drive sprocket in timed relationship to said wrapping machine conveyor.

15. Conveyor structure for transferring articles from a source of supply to a wrapping machine conveyor comprising a longitudinal support beam, a transverse support beam extending at an angle from said wrapping machine conveyor, a corner plate connecting the adjacent ends of said beams, brackets secured to said beams and supporting connected platforms along said beams, a head member secured to the opposite end of said transverse beam from said corner plate, a first sprocket rotatably mounted on said head member and generally parallel to the surface of said wrapping machine conveyor, a corner sprocket rotatably mounted on said corner plate, an end sprocket rotatably mounted on the free end of said longitudinal beam, a chain trained around said sprockets in feeding and returning reaches, pins secured to said chain and projecting therefrom at intervals over said platforms to advance stacks of articles therealong, and means for driving said chain in timed relationship to said wrapping machine conveyor.

JOHN W. SMITH.

REFERENCES CITED

The following references are of record in the file of this patent:

UNITED STATES PATENTS

| Number | Name | Date |
|---|---|---|
| 1,280,950 | Bernheim | Oct. 8, 1918 |
| 1,356,167 | Niver | Oct. 19, 1920 |
| 1,895,411 | Durbin | Jan. 24, 1933 |
| 2,449,669 | Pohlers | Sept. 21, 1948 |